L. E. LOWE.
VALVE STEM AND HEAD THEREFOR.
APPLICATION FILED OCT. 8, 1910.

1,020,766.

Patented Mar. 19, 1912.

Witnesses
Dennis Dalton
G. G. Drumm

Inventor
Levi E. Lowe

By C. C. Shepherd
Attorney

UNITED STATES PATENT OFFICE.

LEVI E. LOWE, OF COLUMBUS, OHIO.

VALVE-STEM AND HEAD THEREFOR.

1,020,766.  Specification of Letters Patent.  Patented Mar. 19, 1912.

Application filed October 8, 1910. Serial No. 585,936.

*To all whom it may concern:*

Be it known that I, LEVI E. LOWE, a citizen of the United States, residing at Columbus, in the county of Franklin and State of Ohio, have invented certain new and useful Improvements in Valve-Stems and Heads Therefor, of which the following is a specification.

The present invention relates to valve stems and heads therefor and in the present instance, it is my purpose to provide an improved form of valve stem and a head connected therewith, which will be firmly and securely held in position, and yet will obviate the employment of threads, nuts and the like in securing the head in position. Heretofore in devices of this character with which I am acquainted, it has been customary to form the stem of the valve of a uniform diameter and to secure the head thereof by threading the end of the stem, the opening through the head having the walls thereof correspondingly threaded. There has been incident, however, to such a construction the objection that the head nut is liable to work off after the valve has been in use for a while. Another objection to employing a threaded stem, lies in the fact that the threading of the stem weakens the metal to such an extent that the stem is often broken, and it is to obviate such disadvantage that the present invention is devised.

In carrying out my invention, I flare or outwardly taper the end of the stem and correspondingly taper the head nut, slotting the latter so that the nut will embrace the reduced portion of the stem, but when forced to the end or outwardly tapered portion of said stem, will securely and frictionally engage the same. After the head has been so positioned, it can only be removed by depressing the same to the reduced portion of the stem, the head being then removed in the obvious manner.

With the above recited objects and others of a similar nature in view, my invention consists in the construction, combination and arrangement of parts set forth in and falling within scope of the appended claim.

Figure 2:
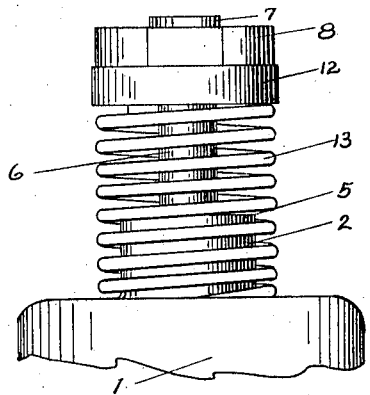
Figure 1:
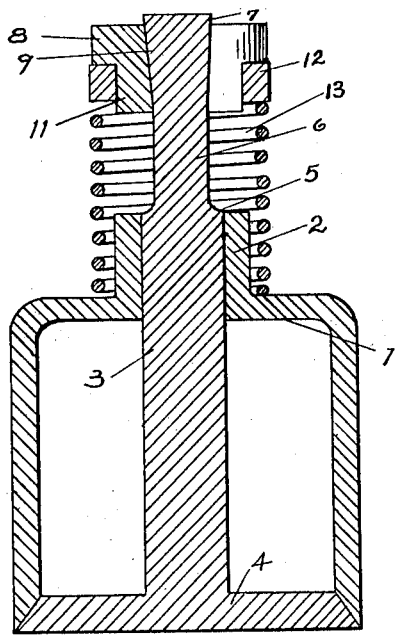
Figure 3:
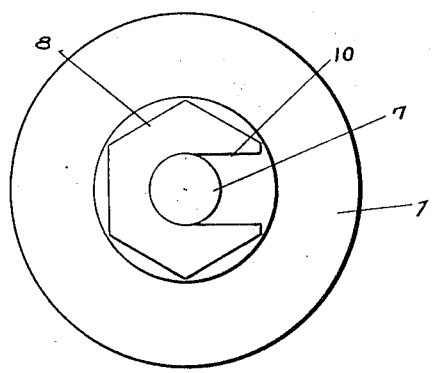

In the accompanying drawing: Figure 1 is a vertical sectional view taken through a portion of a valve embodied with my improvements, Fig. 2 is a view in elevation of a portion of a valve embodying my improvements, and, Fig. 3 is a top view of the same.

Referring now to the accompanying drawings in detail, the numeral 1 designates a valve casing of any ordinary and well known type, having the neck 2 extending upward therefrom and through which passes the lower portion 3 of the valve, the disk 4 of said valve closing the lower end of the casing, said valve being adapted to open and close in the usual manner. The upper section of the valve stem 3, is formed with a shoulder 5, from which extends the reduced portion 6 of the stem, said reduced portion being of uniform diameter and merges into the enlarged outwardly tapered end section 7 of the stem. The valve head 8 is of the usual hexagonal form in contour and has the bore 9 thereof outwardly tapered to conform to the taper of the section 7. This head or nut is also provided with an open section 10, by means of which the head may be slipped upon the reduced portion 6 of the valve stem and said head is then moved or forced upon the enlarged tapered end section 7, so that it is firmly wedged in position and held by frictional contact. The lower reduced portion 11 of the head, may be embraced by a ring 12 against the underside of which bears the upper end of the spring 13, the lower end of said spring encircling the neck of the valve casing and resting against the upper surface of said casing.

From the above description, taken in connection with the accompanying drawings, the construction and operation of my improved valve stem and head will be readily apparent to those skilled in the art.

In assembling the parts, the head 8 is slipped upon the reduced portion of the stem and thence forced toward the enlarged section of the latter, so that it is firmly wedged in position, the ring and spring having first been placed in their proper positions and said spring being depressed to permit the head to be slipped into position as described. When the valve is so assembled, the liability of the head becoming detached, as is the case with the ordinary screw threaded head, is greatly reduced and at the same time a simple, economical yet durable construction is attained.

What I claim, is—

The combination with a valve casing having an extended bearing, of a valve construction combining a valve, a stem extending through said bearing, a shoulder on said stem, a reduced cylindrical portion extending from said shoulder, an outwardly flared extension on said portion, a nut having a cut-out portion, a depending neck on said nut, said nut and neck having an outwardly flared bore for wedging on said extension, a bearing collar embracing said neck and covering the said cut-out portion, and a coiled spring embracing the extended bearing of said casing and bearing against the underside of said collar, said neck extending below said collar and into said spring whereby the spring is maintained in centered position.

In testimony whereof I affix my signature in presence of two witnesses.

LEVI E. LOWE.

Witnesses:
C. C. SHEPHERD,
INGLE A. MORRIS.

Copies of this patent may be obtained for five cents each, by addressing the "Commissioner of Patents, Washington, D. C."